US009026547B2

(12) United States Patent
Roloff

(10) Patent No.: US 9,026,547 B2
(45) Date of Patent: May 5, 2015

(54) FAULT-TOLERANT SEARCH

(75) Inventor: Jeffrey Roloff, San Jose, CA (US)

(73) Assignee: Coupons.com Incorporated, Mountain View, CA (US)

( * ) Notice: Subject to any disclaimer, the term of this patent is extended or adjusted under 35 U.S.C. 154(b) by 195 days.

(21) Appl. No.: 13/412,472

(22) Filed: Mar. 5, 2012

(65) Prior Publication Data

US 2013/0232163 A1 Sep. 5, 2013

(51) Int. Cl.
G06F 17/30 (2006.01)
G06F 7/00 (2006.01)
G06F 3/023 (2006.01)

(52) U.S. Cl.
CPC ...... *G06F 17/30646* (2013.01); *G06F 17/3064* (2013.01); *G06F 3/0237* (2013.01)

(58) Field of Classification Search
None
See application file for complete search history.

(56) References Cited

U.S. PATENT DOCUMENTS

| | | | |
|---|---|---|---|
| 4,745,468 A | 5/1988 | Von Kohorn | |
| 4,876,592 A | 10/1989 | Von Kohorn | |
| 4,926,255 A | 5/1990 | Von Kohorn | |
| 5,034,807 A | 7/1991 | Von Kohorn | |
| 5,057,915 A | 10/1991 | Von Kohorn | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,368,129 A | 11/1994 | Von Kohorn | |
| 5,508,731 A | 4/1996 | Von Kohorn | |
| 5,697,844 A | 12/1997 | Von Kohorn | |
| 5,713,795 A | 2/1998 | Kohorn | |
| 5,759,101 A | 6/1998 | Von Kohorn | |
| 5,761,648 A | 6/1998 | Golden et al. | |
| 5,791,991 A | 8/1998 | Small | |
| 5,907,830 A | 5/1999 | Engel et al. | |
| 5,916,024 A | 6/1999 | Von Kohorn | |
| 6,144,958 A * | 11/2000 | Ortega et al. | 1/1 |
| 6,321,208 B1 | 11/2001 | Barnett | |
| 6,336,099 B1 | 1/2002 | Barnett et al. | |
| 6,918,086 B2 * | 7/2005 | Rogson | 715/257 |
| 7,296,019 B1 * | 11/2007 | Chandrasekar et al. | 1/1 |
| 7,734,621 B2 | 6/2010 | Weitzman et al. | |
| 7,784,702 B2 | 8/2010 | Michels | |
| 7,962,931 B2 | 6/2011 | Bova | |
| 8,000,496 B2 | 8/2011 | Keswanie et al. | |
| 8,055,642 B2 | 11/2011 | Boal et al. | |
| 8,165,078 B2 | 4/2012 | Walsh et al. | |

(Continued)

FOREIGN PATENT DOCUMENTS

AU 2006/294868 6/2011

*Primary Examiner* — Augustine K Obisesan
*Assistant Examiner* — David T Brooks
(74) *Attorney, Agent, or Firm* — Hickman Palermo Becker Bingham LLP

(57) ABSTRACT

In an embodiment, a method comprises performing a first search based on a first text string; based on the first search, identifying one or more search results; after identifying the one or more search results, causing the one or more search results to be displayed; while the one or more search results are displayed: receiving input that changes the first text string to a modified text string; in response to receiving the input: performing a second search based, at least in part, on a portion of the modified text string, and determining that no search results are identified based on the second search; after determining that no search results are identified based on the second search, continuing to display the one or more search results; wherein the method is performed by one or more computing devices.

22 Claims, 17 Drawing Sheets

(56) References Cited

U.S. PATENT DOCUMENTS

| | | | |
|---|---|---|---|
| 2007/0288648 A1* | 12/2007 | Mehanna et al. | 709/231 |
| 2008/0195940 A1* | 8/2008 | Gail et al. | 715/257 |
| 2008/0256057 A1* | 10/2008 | Riise et al. | 707/5 |
| 2009/0094221 A1* | 4/2009 | Cameron et al. | 707/5 |
| 2011/0202876 A1* | 8/2011 | Badger et al. | 715/816 |
| 2012/0259615 A1* | 10/2012 | Morin et al. | 704/9 |
| 2013/0066896 A1* | 3/2013 | Mehanna et al. | 707/767 |

* cited by examiner

FAULT-TOLERANT SEARCH

TECHNICAL FIELD

Embodiments relate generally to computer-assisted searching of lists or other electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The ubiquity of handheld devices, particularly smartphones, allows people to make lists "on the go." The types of lists that people create vary widely. Typical examples include grocery lists, other types of shopping lists, and to-do lists.

A list management computer program executing on a device allows a user to create one or more lists of items and to view the one or more lists. In some list management computer programs, each character selected by a user causes the list management computer program to perform a search against a database of words or phrase to find a possible match. For example, if a user types in "Alpha" and then "a", the computer program will search a database for "Alpha a". If the database includes items "Alpha apples" and "Alpha artichokes", then the computer program may cause "Alpha apples" and/or "Alpha artichokes" to be displayed on the user's device to allow the user to select one of those options without the user having to enter or select each of the remaining characters in the displayed options. In other words, if the user selects the option "Alpha apples" after typing in the last "a", then the user does not have to enter in the partial string "pples" in order for "Alpha apples" to be added to a list.

One problem with current list management software is that if no match occurs between a current string and a string in a database, then no search results are displayed to the user. For example, a user types in "Alpha" and a database of phrases only includes three Alpha products: "Alpha apples", "Alpha artichokes" and "Alpha bananas". Each of those phrases are displayed to the user. However, if the user next selects "s" (which renders the current string to be "Alpha s"), then the list management program, upon discovering that "Alpha s" does not match any phrase in the database, displays a message that no search results were found.

SUMMARY OF THE INVENTION

The appended claims serve to summarize the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Computing Device
    2.1. Search Processor
    3.0. Fault Tolerant Searching
    3.1 Single Counter Approach
    3.2 Delimiters Within Text String
        3.2.1 History Check
        3.2.2 Empty Check
        3.2.3 Search Decision
        3.2.4 Responding to a "Bad" Character
        3.2.5 Tolerance Threshold
    3.3 Search Example
    4.0. Implementation Mechanism—Hardware Overview
    5.0. Extensions and Alternatives 1.0. General Overview In an embodiment, processing a text string that is used to perform a search is performed in such a way that misspellings and other errors in a user's entering of the text string will not cause the previously valid search results to disappear. Instead, such search results may still be displayed even though a search based on the text string yields no results. In this way, the system that processes the text string is considered "fault-tolerant."

2.0. Computing Device

Figure 4:
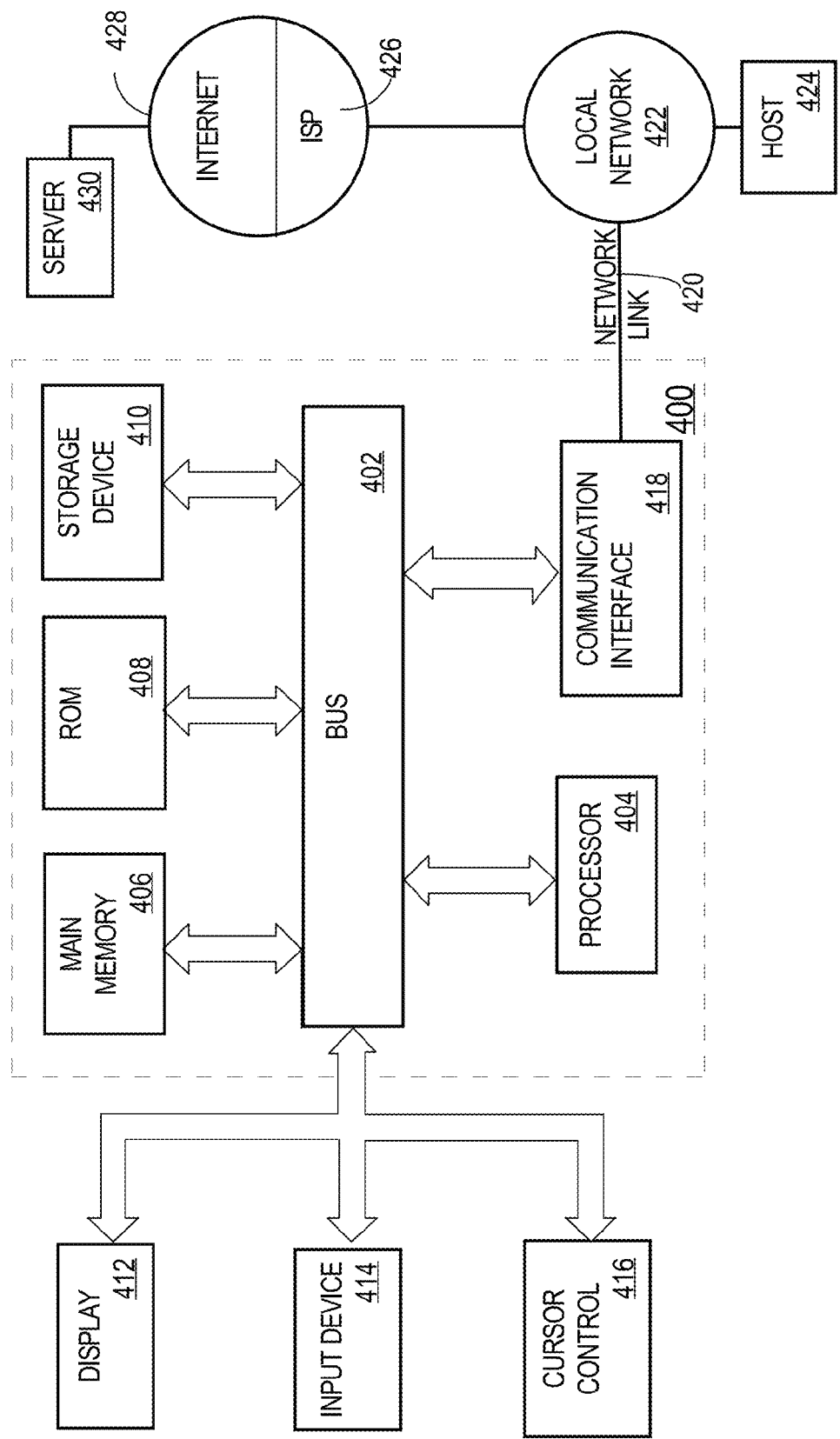
FIG. 4 is a block diagram of a computer system upon which embodiments may be implemented.

In an embodiment, a computing device accepts input and processes a text string against a database of pre-defined phrases. The computing device is any computing device that is capable of receiving input from a user and displaying search results based on the input. Examples of a computing device include a desktop computer and a handheld device, such as a laptop computer, a tablet computer, and a "smart" phone. The computing device may be structured as shown in FIG. 4, which is described separately below.

The computing device may include communication technology (for example, wireless technology) for sharing information with other devices. The computing device may include a variety of integrated user interface units or can be coupled to user interface units through one or more communication ports or data links of the device. Non-limiting examples of user interface units include a voice input unit (for example, a microphone), physical input units (for example, a keyboard, a mouse, a track ball, a rotary dial or wheel, a touchpad, or a touch-screen), and motion sensors (for example, an accelerometer, magnetometer, or a gyroscope). Any of these user interface units can be implemented as an external unit that communicates with the computing device to provide user input using a wired or wireless communication technology. Examples of wired communication technology include Universal Serial Bus (USB) interface, FireWire interface, etc. Examples of wireless communication technology include Bluetooth, Wi-Fi, WiMax, infrared, etc. Through these user interface units, the computing device can receive physical or voice inputs from a user.

The computing device includes one or more output units to present visual and, optionally, audio information to a user.

Non-limiting examples of output units include a display unit for displaying visual data and a speaker for playing audio.

2.1. Search Processor

In an embodiment, the computing device includes a search processor that accepts and processes input, whether voice input converted to text or direct text input. With this input, the search processor performs additional functions, such as managing a to-do list, a set of reminders, and/or a grocery list. The particular additional functions of the search processor are not critical and embodiments may be used with a variety of additional functions. The search processor may be implemented in software, hardware, or any combination of software and hardware.

In an embodiment, the computing device includes a database of pre-defined phrases that the search processor accesses in order to perform a search based on text input. The search processor may cause one or multiple search fields to be displayed on the computing device. In response to detecting that one or more characters have been added to a search field, the search processor causes a search to be performed based on the current text string in the search field. The search processor (or another hardware or software component) compares the current text string to one or more pre-defined phrases in the database. The type of search processor may dictate the type of phrases that are part of the database. For example, if the search processor is a grocery list application, then the database may include (a) generic product names (for example, "macaroni and cheese" and "cereal") that do not identify any brand and/or (b) specific product names (for example, "Charlie Corn Flakes") that identify an actual brand. As another example, if the search processor is a music application, then the database may include (a) names of songs, (b) names of artists, and/or (c) names of genres.

In an embodiment, instead of the search processor processing a current text string, a device that is separate from the computing device processes the current text string. Such a separate device may be remote relative to the computing device and, thus, may be communicatively coupled with the computing device directly or indirectly using one or more data communications networks. In this embodiment, the computing device uses one or more communication protocols to generate and send, to the other device, a current text string. The other device processes the current text string (for example, using one of the processes described below) and may respond with updated search results or no search result.

A data communication network may be implemented by any medium or mechanism that provides for the exchange of data between various computing devices. Examples of a data communication network include, without limitation, a Local Area Network (LAN), Wide Area Network (WAN), internetwork, or one or more terrestrial, satellite, or wireless links. The data communication network may include a combination of networks such as those described. The data communication network may transmit data according to any of a variety of data communications protocols such as Transmission Control Protocol (TCP), User Datagram Protocol (UDP), and/or Internet Protocol (IP).

3.0. Fault-Tolerant Searching

Figure 1:
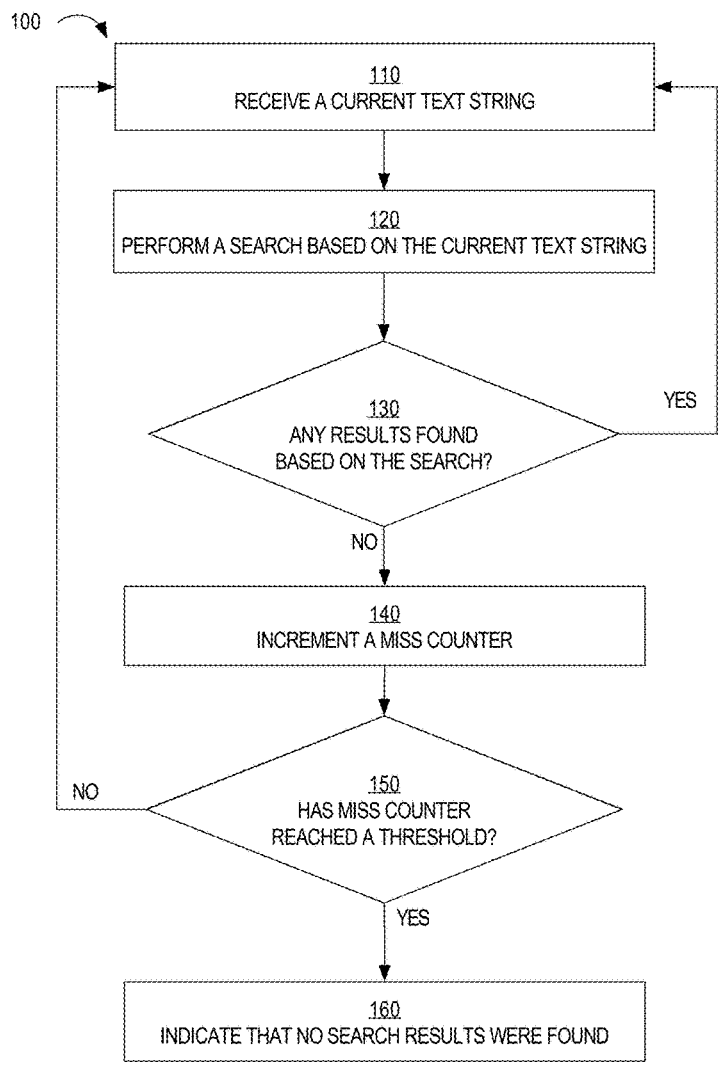
FIG. 1 depicts an example process for performing a search based on a text string.
Figure 2A:
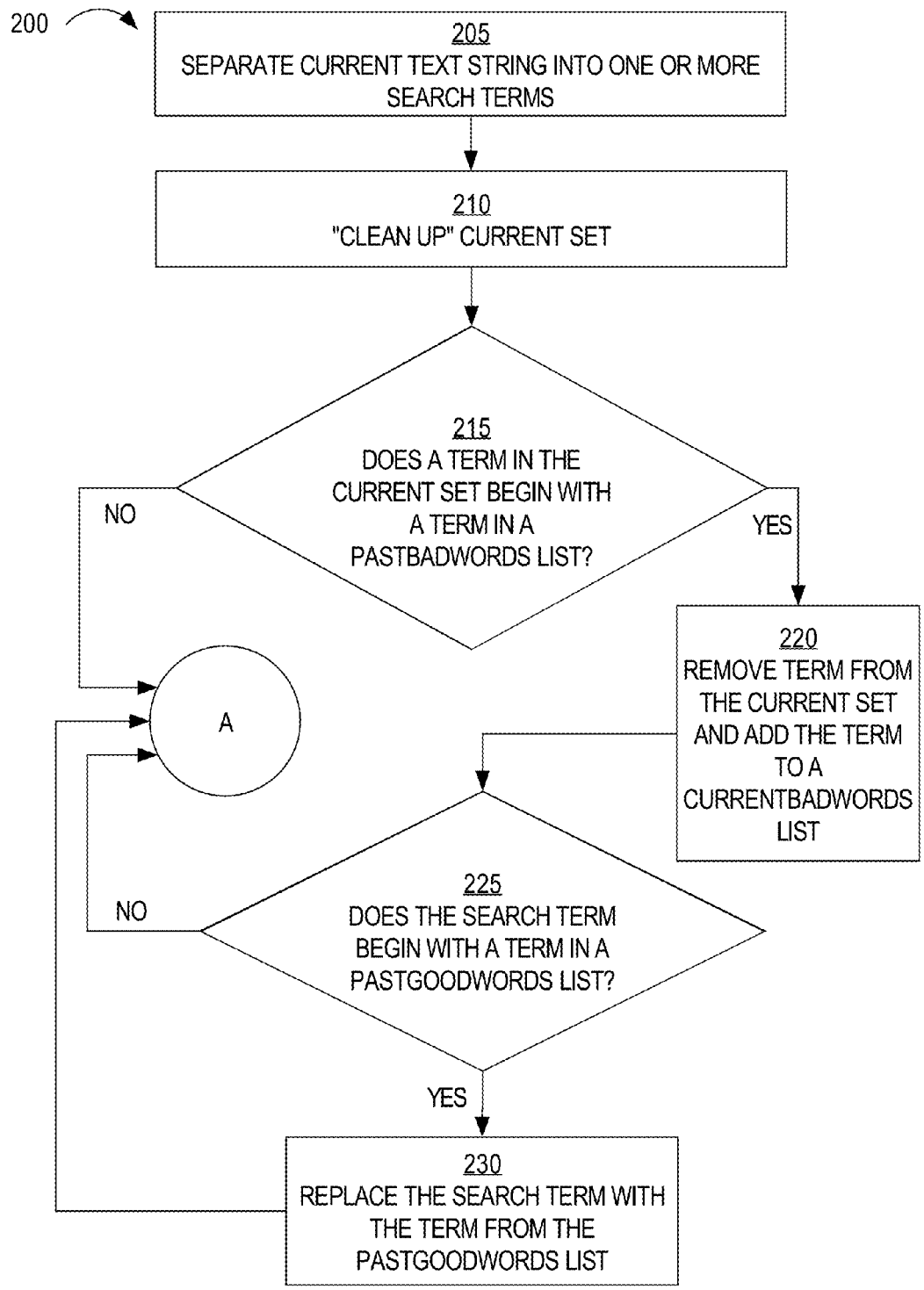
FIG. 2A, FIG. 2B, FIG. 2C, FIG. 2D depict another example process for performing a search based on a text string.
Figure 2B:
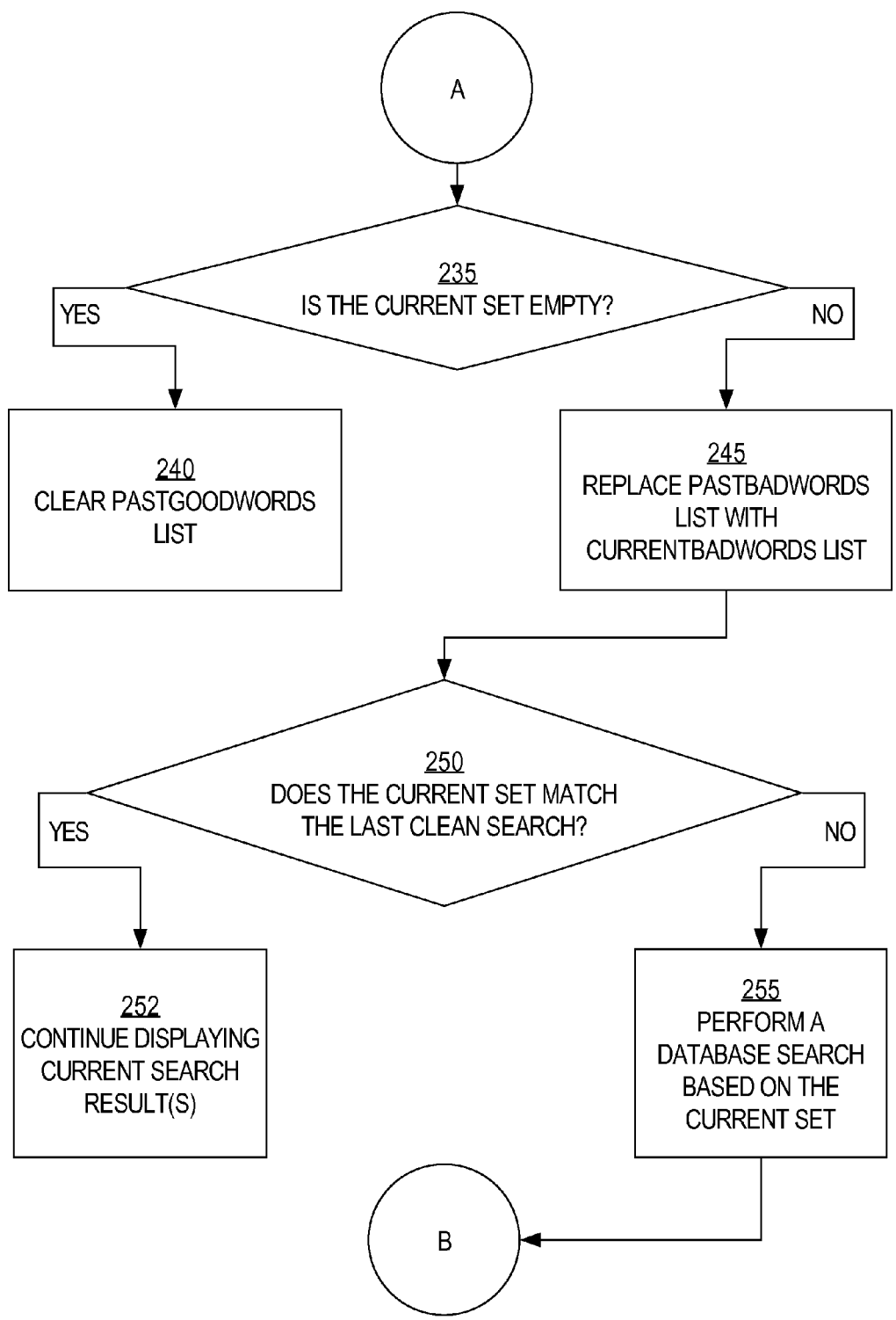
Figure 2C:
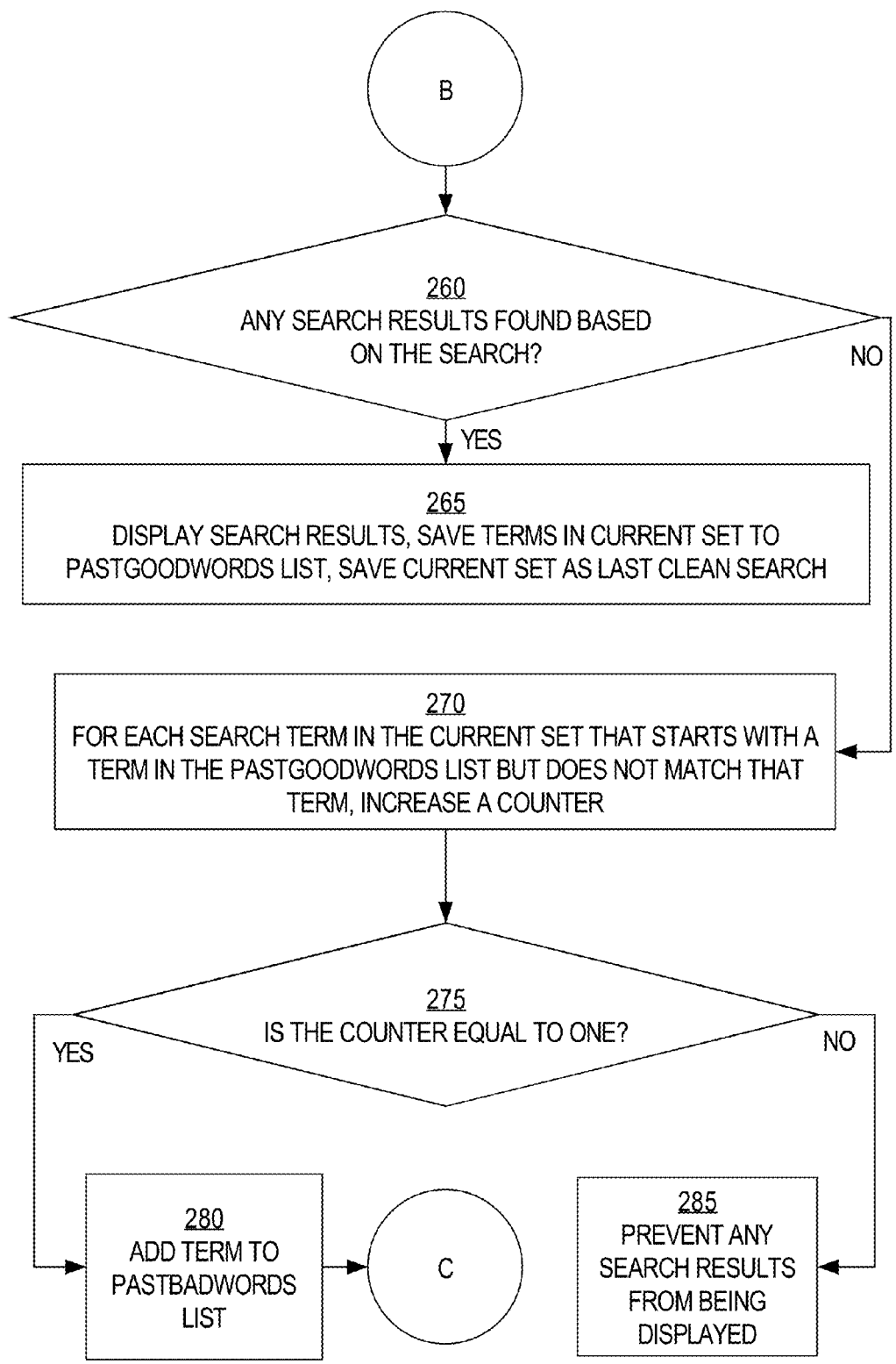
Figure 2D:
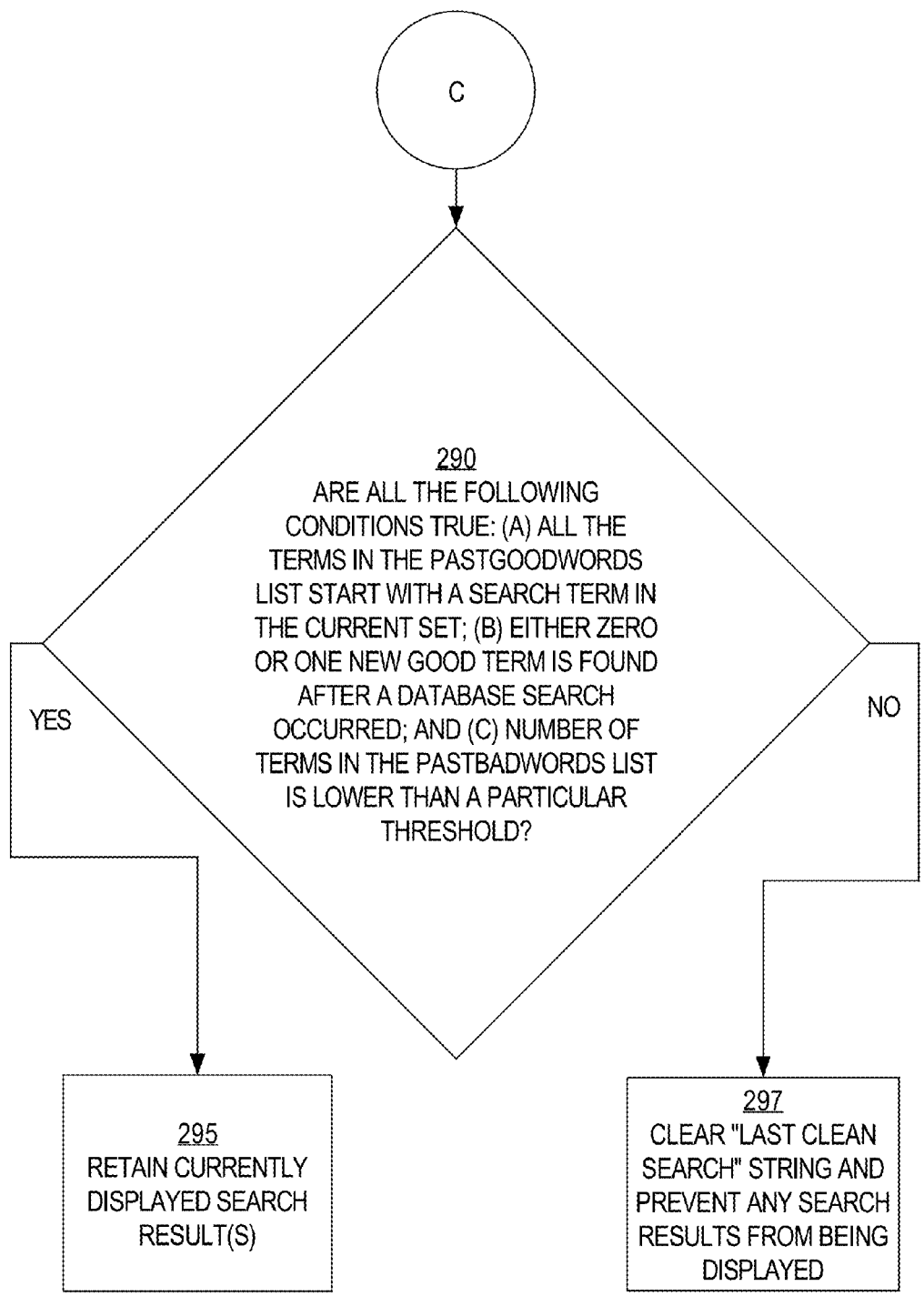

The following flow diagrams (in FIG. 1 and FIG. 2) depict different processes 100 and 200 for performing a search based on a text string. Process 100 represents a type of fault-tolerant search that is relatively simpler than the fault-tolerant search represented by process 200. Although process 100 and process 200 illustrate two different approaches to performing a fault-tolerant search, embodiments of the invention are not limited to these two specific approaches.

Each process may be performed on the computing device described previously. Alternatively, as indicated above, each process may be performed by a device that is remote relative to the device that receives the user input.

In an embodiment, whether process 100 or process 200, the process is performed each time a user selects a character that is to be added to a current text string. One or more characters of the current text string may have been entered by a user selecting "soft" characters that are displayed on a touch screen of a computing device. Alternatively, one or more characters of the current text string may have been entered by a user selecting "hard" keys on a physical keyboard associated with the computing device. The physical keyboard may be a peripheral device that is coupled to the computing device or may be integrated with the computing device.

Alternatively, one or more characters of the current text string may have been entered by a user providing voice input to a computing device, which translates the voice input into audio data. A voice recognizer (which may be implemented on the computing device or on another device, not shown) generates one or more characters based on the audio data.

Each time one of processes 100, 200 is performed is referred to herein as an "iteration." A "search session" is one or more iterations of process 100 or process 200. A search session ends when a user has selected a search result or when a text field (into which characters are entered) is cleared of characters. The text field may be cleared when the user removes (for example, using a "Backspace" key) all the characters from the text field. Alternatively, the text field may be cleared when a user selects a search result or provides input (for example, by selecting an "Enter" button) that indicates that the user is finished entering a text string. For example, a user may be entering names of multiple grocery items into a text field. Each time the user is done entering a name of a grocery item into the text field, the user selects a graphical "Done" or "Add" button, which causes the name to be added to a list and causes the text field to be cleared.

In a related embodiment, a process (whether process 100 or process 200) is not performed until a certain number of characters are entered. For example, regardless of the character selected, the process is not performed until the current text string includes at least thee characters. As another example, a portion of the process is performed but no search results are displayed until a database search yields less than a certain threshold of search results, such as 25 search results. A search that yields more than 25 search results may indicate that the current text string (for example, "che" has not yet been sufficiently formed. If, for example, two characters yield less than 25 search results, then that may indicate that the permutation of two characters (for example, "zo") is relatively unique.

3.1. Single Counter Approach

Process 100 may be considered a single counter approach because process 100 relies on a single counter that is maintained between different iterations of process 100. Process 100 begins when one or more search results have already been identified for a current text string. Thus, a user must have entered a string of one or more valid characters that has produced one or more search results.

At block 110, a current (or updated) text string is received. For example, a user selects the letter "z", which is added to the text string "whole" causing the current text string to be "whole z".

At block 120, a search is performed based on the current text string. The search may be of one or more databases that reside on a computing device that executes the search or on a device that is remote relative to the computing device.

At block 130, it is determined whether any search results have been found based on the search using the current text string. If so, process 100 halts and proceeds to block 110 when it is determined that the current text string has been updated. Otherwise, if no search results have been found, then process 100 proceeds to block 140.

At block 140, a counter is incremented to reflect a number of times a search has been performed and no search results have been returned. Initially, the counter is zero. In an embodiment, the counter is reset to zero at block 130 whenever a successful search is performed. A successful search is one that yields one or more search results.

In an embodiment, if the user deletes or otherwise removes a character from the current text string, then the counter is not incremented, even though an unsuccessful search may occur after a character is removed from the current text string. The deleting of characters by the user may indicate that the user has recognized a misspelled search term and is attempting to correct the misspelling. Alternatively, the deleting may indicate that the user is attempting to remove the search term altogether.

In a related embodiment, deleting characters does not trigger process 100. Instead, only the addition of characters triggers process 100.

At block 150, it is determined whether the counter has reached a certain threshold. The threshold indicates a number of times a search is performed that yields zero results. If the counter reaches the threshold, then process 100 proceeds to block 160. Else, process 100 halts and proceeds to block 110 when it is determined that the current text string has been updated.

At block 160, an indication that no search results are found is displayed. The indication may be in the form of a graphic (for example, a red "X" over the current text string), an audible sound, a vibration of the computing device, and/or text that reads "No search results" found. Additionally or alternatively, the indication involves removing the search results that are currently displayed from display. Viewing (or hearing or feeling) the indication may cause the user to remove one or more characters of the current text string or completely start over by clearing the search field into which the characters of a text string are entered.

In an embodiment, the counter is reset to zero after each search session. In other words, when a user selects a search result after entering one or more characters or provides other input that indicates that the user is finished entering a text string, the counter is reset to zero in anticipation for a new search session. A new search session may begin when the user enters a character to an empty text field.

3.2. Multiple Word Lists Approach

FIG. 2A, FIG. 2B, FIG. 2C, FIG. 2D are flow diagrams that depict another process 200 for performing a search based on a text string. Process 200 may be considered a multiple word lists approach because process 200 relies on maintaining multiple word lists between different iterations of process 200.

At block 205, a current text string, which is identified in a text field, is analyzed to identify individual search terms. Search terms in the text string may be delimited or separated by a space character (" ") and/or one or more other characters, such as a comma (","), a period ("."), a dash ("-"), and a forward slash ("/"). The set of one or more search terms are referred to as the "current set".

At block 210, a "clean up" operation is performed with respect to the current set. "Clean up" refers to analyzing one or more search terms to determine whether to remove (or otherwise cause to be ignored in subsequent blocks of process 200) one or more characters from the current set. Such characters may include punctuation, such as exclamation points, colons, semi-colons, etc. For example, "milk;" may be "cleaned up" to remove the semi-colon. Other characters that may be removed (or effectively ignored) may include one-letter terms (such as "z"), and two-letter terms (such as "ek"). Thus, after block 210, the current set may be shorter in length and, possibly, shorter in the number of terms than the current set was at the start of block 210.

Some one-letter and other short terms may not be removed from the current set during block 210, especially, if such terms occur after a complete word. For example, "whole m" may be the current set and "whole" and "m" may remain as the search terms after block 210. The one-letter term "m" may serve as a filter on the results that were identified based on a search using "whole" as the search term.

3.2.1 History Check

At block 215, for each search term in the current set, it is determined whether the search term begins with a search term in a PastBadWords list. The PastBadWords list is a list of one or more terms that were classified as "bad" in a previous iteration of process 200 but in the same session as the current iteration of process 200. For example, the one or more terms in the PastBadWords list may have been identified during the most recent iteration of process 200. As described in more detail below, the PastBadWords list may have been a CurrentBadWords list in the last iteration of process 200. A term may be classified as a "bad" term if a search performed using the term yielded no search results.

If, at block 215, it is determined that the search term in the current set begins with a search term in the PastBadWords list, then process 200 proceeds to block 220. Blocks 215-225 may be referred to collectively as a "history check" phrase of process 200.

At block 220, the search term in the current set is added to a CurrentBadWords list that is initially empty when the present iteration of process 200 begins. The search term is also removed from the current set. For example, the PastBadWords list may include "milkk" and a search term in the current set may be "milkkk" Because "milkkk" begins with "milkk", "milkkk" is removed from the current set.

At block 225, it is determined whether the search term begins with a term in a PastGoodWords list. Similar to the PastBadWords list, the PastGoodWords list is a list of one or more words that were classified as "good" before block 205. For example, the one or more words in the PastGoodWords list may have been identified during the most recent iteration of process 200. For example, the PastGoodWords list may have been a CurrentGoodWords list in the last iteration of process 200. A term may be classified as a "good" term if a search performed using the term yielded one or more search results.

If, at block 225, it is determined that the search term in the current set begins with a particular term in the PastGoodWords list, then process 200 proceeds to block 230.

At block 230, the particular term replaces the search term in the current set. This situation might occur when a previous search term is "milk" and the user then selects the "z" character to cause the search term to become "milkz" and then selects the "y" character to cause the search term to become "milkzy." During this iteration of process 200, the PastBadWords list includes "milkz" and the PastGoodWords list includes "milk". Because "milkzy" begins with PastGoodWord "milk" despite also beginning with a PastBadWord "milkz", the search term "milk" replaces "milkzy" as a search term in the current set. Thus, while block 220 may involve removing a particular term from the current set, block 230 may involve adding another term that is related to the particular term to the current set. After block 230, process 200 proceeds to block 235.

If, at block 225, it is determined that the search term in the current set does not begin with a term in the PastGoodWords list, then process 200 proceeds to block 235.

If, at block 215, it is determined that each search term in the current set does not begin with a search term in the PastBadWords list, then process 200 proceeds to block 235.

3.2.2 Empty Check

By block 235, all the search terms in the current set since block 205 have been processed. In other words, if there are multiple search terms in the current set, then blocks 215-230 may be performed for each of the search terms.

At block 235, it is determined whether the current set is empty. The current set may be empty if each search term in the current set is removed at block 220. If the current set is empty, then process 200 proceeds to block 240.

At block 240, the PastGoodWords list is cleared (or emptied) if not already cleared, which indicates that the user is starting a new search since no PastGoodWords were substituted onto into the current set at block 230. In an embodiment, no search results are displayed to the user, even if there were search results displayed at the beginning of this iteration of process 200. In an alternative embodiment, any search results that were displayed prior to the current iteration of process 200 continue to be displayed to the user.

From block 240, process 200 does not proceed to any subsequent block. Instead, process 200 may begin anew at block 205 if the user selects another character or the current text string otherwise changes.

If, at block 235, it is determined that the current set is not empty, then process 200 proceeds from block 235 to block 245.

In one scenario, a user might cut and paste multiple characters and/or terms into a search field, effectively removing any prior characters that were processed during the current search session. In such a scenario, the search processor may detect this and clear any lists that are not empty, such as the PastBadWords list and the PastGoodWords list and, thus, the next iteration of process 200 will be treated as the first iteration of process 200 for the newly entered search term(s). Thus, a new search session is initiated. Alternatively, process 200 is performed with respect to the newly entered search term(s) as if the next iteration of process 200 is part of the same search session as the last iteration of process 200. In this scenario, process 200 would proceed from block 215 directly to block 235, or 250, or 255. (Blocks 235, 245, 250 are optional.)

3.2.3 Search Decision

At block 245, the PastBadWords list is replaced with the CurrentBadWords list. In other words, the "bad word(s)" that were identified in the history check phase will become the "bad word(s)" for the subsequent iteration of process 200 if the user selects another character that is to be added to the current text string. Thus, for example, if the current text string is "wholef mil" and "wholef" was added to the CurrentBadWords list at block 220, then "wholef" becomes part of the PastBadWords list. If both the PastBadWords list and the CurrentBadWords list are empty, then block 245 may be skipped.

At block 250, it is determined whether the current set matches the "last clean search." The "last clean search" is the most recent set of one or more search terms that resulted in one or more search results. If so, then the existing search results that are displayed are left unchanged. Also, there is no need to perform a search of a database.

For example, the last clean search may be "whole milk" and, at the beginning of this iteration of process 200, the current set may have become "whole milk jj." After cleaning up the current set, the current set becomes, at block 250, "whole milk." Because the current set is the same as the last clean search, there is no need to perform another search using the current set.

Generally, adding "bad characters" (for example, "jjjj") to a text string (for example, "whole milk") that produced search results will not cause the search results to change. That is because the "bad" characters are effectively ignored during the "clean up" phase (i.e., block 210) and during the history check phase (i.e., blocks 215-225). Similarly, removing a series of "bad" characters from a text string (for example, "whole milkkkkk") that were recently added to the text string will not cause the search results to change even though "milkkkkk" is not found in a database of pre-defined phrases.

In an embodiment, block 250 may have been performed after block 210 and before block 215. However, in that case, the PastBadWords list may not have been updated (as in block 245), which means that words in that list may negatively affect the processing of the current set when additional characters are added to the current set or removed from the current set.

If, at block 250, it is determined that the current set does not match the "last clean search", then process 200 proceeds to block 255. Up to this point, no search based on the text string identified at block 205 has yet been performed.

At block 255, one or more databases of pre-defined phrases are searched based on the current set. The one or more databases may be stored on the computing device that implements process 200 or may be stored on one or more devices that are remote relative to the computing device. If the current set includes only a single term, then the search may involve identifying one or more phrases in the database that most closely match that term. For example, if the current set is "che" then phrases that match "che" might be, in order of predicted relevance, "cheese", "cherries", "cheddar cheese", "bing cherries", and "Kagan macaroni and cheese".

If the current set includes multiple terms, then the search of the database may involve multiple searches. For example, a current set of "whole milk" may be used to search the database for the string "whole milk" in that order, for "milk whole" in that order, for "whole" and "milk" in any order, and for just "whole" and just "milk."

Entries in the one or more database, against which the current set are compared, may comprise one or more fields. For example, one field may correspond to a short phrase description of a specific product, such as "Lamba Vitamin D Milk" while another field may correspond to a further description of the product, such as "whole". Thus, during a search of a database, a search term in the current set may be compared to each field of multiple entries in a database. The relevancy or "strength" of a match may depend on whether the search term matches a term in one field of an entry or a term in another field of the same entry. For example, exact or partial matches to terms in a product field of a product entry may be identified as more relevant than exact or partial matches in a description field of the product entry.

At block 260, it is determined whether any search results are found based on the search performed at block 255. If so, then process 200 proceeds to block 265.

At block 265, at least a subset of the search results identified from the search performed at block 250 are displayed to the user. Also, all search terms in the current set are saved in the PastGoodWords list and the current set is saved as the "last clean search."

If, at block 260, it is determined that no search results were identified during the search that was performed at block 255, then process 200 proceeds to block 270.

3.2.4 Responding to a "Bad" Character

Block 270 is entered when the user selects one or more "bad" characters. In other words, if block 270 is reached, then that means one or more characters were added to the current text string that caused a search based on the current text string to yield zero results. For example, the current text string may be "milkx" where "milk" was the most recent text string before the current text string. The term "milkx" does not match any words in the database of pre-defined phrases.

At block 270, a counter is incremented for each search term in the current set that starts with a term in the PastGoodWords list but does not exactly match that term. The counter is initially zero for each iteration of process 200. Block 270 may be considered the block where a search term that was previously "good" (i.e., was used to perform a successful search) is identified as becoming "bad" (i.e., no results were retrieved using that search term). A "good" term (for example, "milk") may become "bad" (for example, "milkx") when a user adds a character to the "good" term. Adding such a character causes no search results to be identified during a search using that search term.

As another example, a previous text string was "whole mil" and the current text string is "whole milj." In this scenario, at block 270, the counter is not incremented for the search term "whole" because "whole" would be in the PastGoodWords list. However, the counter would be incremented for the search term "milj" because "milj" starts with a term in the PastGoodWords list (i.e., "mil") but "milj" does not exactly match "mil."

As another example, a previous text string was "whol mil" and then the user moved a cursor to the end of "whol" and typed the letter "d" (instead of the letter "e"). Thus, the current text string becomes "whold mil." In this scenario, at block 270, the counter would be incremented for the search term "whold" because "whold" starts with a term in the PastGoodWords list (i.e., "whol") but "whold" does not exactly match "whol." However, the counter would not be incremented for the search term "mil" because "mil" is already in the PastGoodWords list.

After block 270, process 200 proceeds to block 275.

At block 275, it is determined whether the counter indicates one or more than one. A value of one indicates that exactly one search term from the current set starts with a term in the PastGoodWords list but does not exactly match that term. If the counter indicates one, then process 200 proceeds to block 280.

At block 280, that search term is added to the PastBadWords list. Process 200 then proceeds to block 290.

If, at block 275, it was determined that the counter indicates a number greater than one, then process 200 proceeds from block 275 to block 285.

At block 285, zero search results are displayed. If one or more search results were displayed at the beginning of this iteration of process 200, then those search result(s) are removed from the display. Process 200 may reach block 285 if, for example, the user pasted, into a search field, multiple terms that did not match any phrases in the database.

3.2.5 Tolerance Threshold

At block 290, it is determined whether (a) all terms in the PastGoodWords list begin search terms in the current set, (b) either 0 or 1 new good terms were found after the database search happened, and (c) the number of terms in the PastBadWords list is lower than the threshold set for fault-tolerance.

For example, "whole mil" is a previous text string and the addition of the letter "k" causes the current text string to be "whole milk." When "k" is added to "whole mil", the PastGoodWords list includes "whole" and "mil." The search term "milk" is a new good term that was found after the last successful search that was based on "whole mil." Also, there are no terms in the PastBadWords list at this block. Therefore, in this example, all the conditions of block 290 are met.

The threshold of block 290 indicates a level of "tolerance" given to incorrect spellings. The higher the threshold, the more "tolerant" the search processor is in continuing to display search results. In other words, a high threshold might allow a user to make numerous errors before search results are removed from the display. Conversely, the lower the threshold, the sooner the search processor will notify the user of the mistake in the form of indicating that no search results were found. A threshold of two, for example, indicates that once two "bad" words are identified, no search results are displayed.

In an embodiment, the threshold used in block 290 is "hard-coded" into application code that, when executed, causes the blocks of process 200 to be performed. Thus, the threshold does not change from one text search to another.

In another embodiment, the threshold may change based on one or more criteria, such as user input or the state of the computing device upon which process 200 is implemented. For example, when installing or opening a search processor on a computing device, the user of the computing device may select a value (for example, a "High", "Medium", or "Low" setting for a "Search Fault Tolerance" parameter) that translates into the threshold used in block 290. Thus, a "High" setting may translate to four, a "Medium" setting may translate into three, and a "Low" setting may translate into two.

As another example, if the search processor detects that the computing device has a WiFi connection or a cellular network connection, then the search processor might set the threshold low (for example, one or two) so that if no search results are found on the first or second search, then the current text string is sent over a network to a service that has more computing power and can perform more sophisticated analysis on the current text string. On the other hand, if the search processor detects that the computing device does not have any Internet connection, then the search processor may set the threshold at a higher value, such as three, indicating that three "bad" words need to be identified before no search results are displayed.

If all three conditions of block 290 are met, then, process 200 proceeds to block 295, where the prior search results are retained.

If all these conditions of block 290 are not met, then process 200 proceeds to block 297.

At block 297, the "last clean search" is emptied or set to blank and no search results are displayed to the user.

3.3. Search Example

FIG. 3A, FIG. 3B, FIG. 3C, FIG. 3D, FIG. 3E, FIG. 3F, FIG. 3G, FIG. 3H, FIG. 3I, FIG. 3J, FIG. 3K are diagrams that depict different screenshots of what a grocery application may display after each character is entered into a text field, in accordance with process 200 described previously. FIG. 3A, FIG. 3B, FIG. 3C, FIG. 3D, FIG. 3E, FIG. 3F, FIG. 3G, FIG. 3H, FIG. 3I, FIG. 3J, FIG. 3K represent a single search session. Each screenshot depicted in FIG. 3A, FIG. 3B, FIG. 3C, FIG. 3D, FIG. 3E, FIG. 3F, FIG. 3G, FIG. 3H, FIG. 3I, FIG. 3J, FIG. 3K includes a text field 302, an Add button 304, a keyboard 306, and a search results area 308. In this context, a "screenshot" refers to a graphical user interface image arrangement that the computing device may display under control of program logic that has been configured to perform an algorithm or process, and the description herein of each screenshot and the functions that relate to that screenshot is intended as a description of a computer-executable algorithm that may be used, in one embodiment or implementation.

Figure 3A:
FIG. 3A, FIG. 3B, FIG. 3C, FIG. 3D, FIG. 3E, FIG. 3F, FIG. 3G, FIG. 3H, FIG. 3I, FIG. 3J, FIG. 3K are diagrams that depict different screenshots of what a computing device may display after each character is entered into a text field.

FIG. 3A depicts a screenshot 310 where the current text string in text field 302 is "gre" and the search results area 308 includes three results. These three results may have been retrieved based on the first search performed in the current search session. For example, no search may have been performed until at least three characters are entered into text field 302. Because the search term "gre" produced search results, "gre" is added to the PastGoodWords list in this iteration of process 200.

Figure 3B:
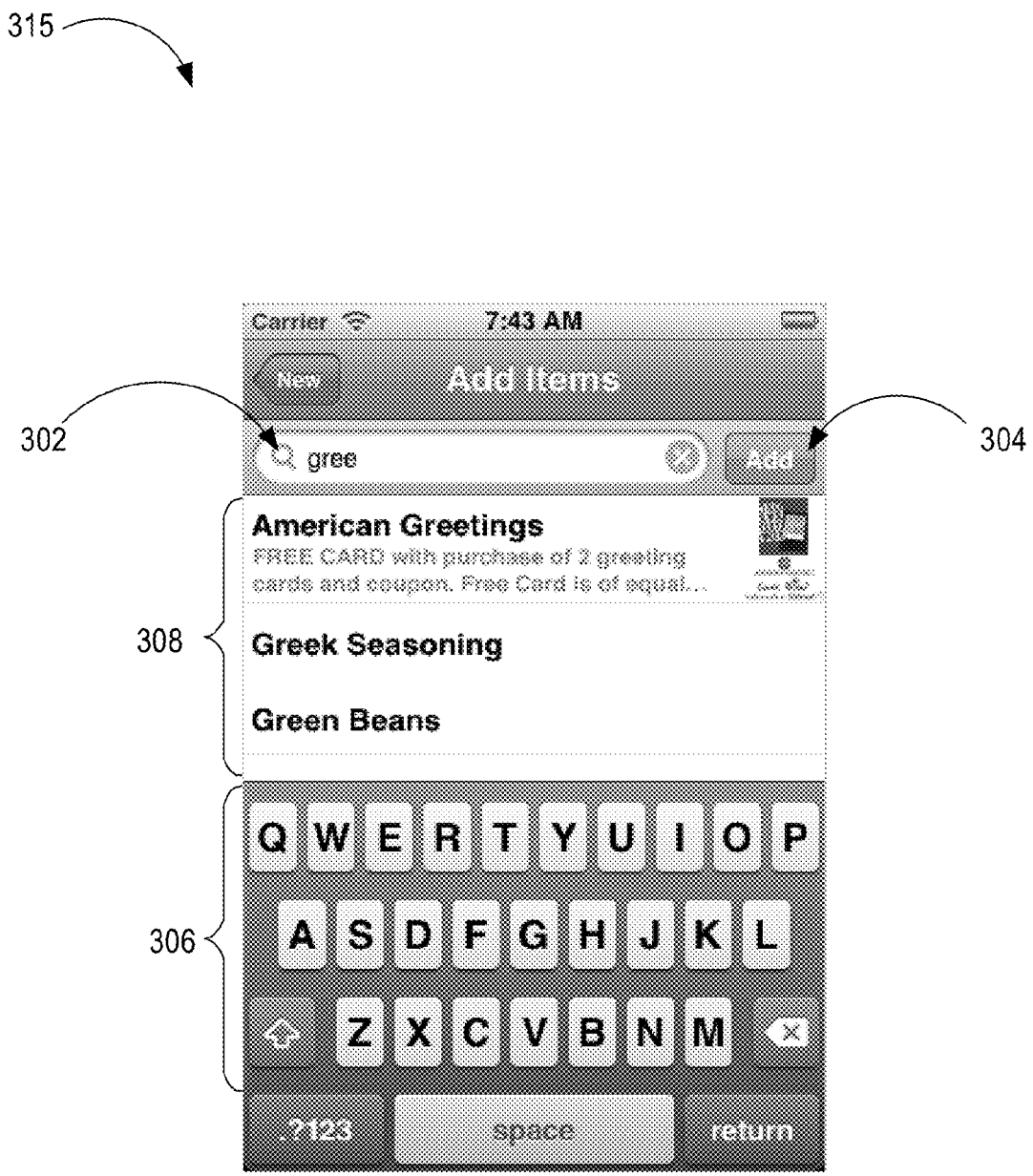

FIG. 3B depicts a screenshot 315 where the current text string in text field 302 is "gree" and the search results area 308 includes three results, which are different than the three results depicted in FIG. 3A. Because the search term "gree" produced search results, "gree" is added to the PastGoodWords list in this iteration of process 200.

Figure 3C:

FIG. 3C depicts a screenshot 320 where the current text string in text field 302 is "greex" and the search results area 308 includes three results that are the same as the results depicted in FIG. 3B. In this example, the user has entered a "bad" character ("x") to a "good" term ("gree"), which has produced results. In this iteration of process 200, process 200 would have proceeded from block 215 (because there are no previous "bad" words yet) directly to block 235, 245, or 250. Then, because "greex" does not match the last clean search (i.e., "gree"), process 200 proceeds from block 250 to block 255, where a search is performed based on "greex". Then, because no search results are found based on "greex" (block 260), process 200 proceeds to block 270, where a counter is increased once because only one search term (i.e., "greex") starts with a past "good" word (i.e., "gree") but does not exactly match that term. At block 275, it is determined that the counter is equal to one and process 200 proceeds to block 280, where "greex" is added to a PastBadWords list. Then, process 200 proceeds to block 290, where it is determined that all the conditions associated with block 290 are met. For example, the number of terms in the PastBadWords list (i.e., now one) is less than a particular threshold, such as three. Process 200 then proceeds to block 295, where the search results obtained during the last iteration of process 200 are retained and, thus, not removed from display.

Figure 3D:
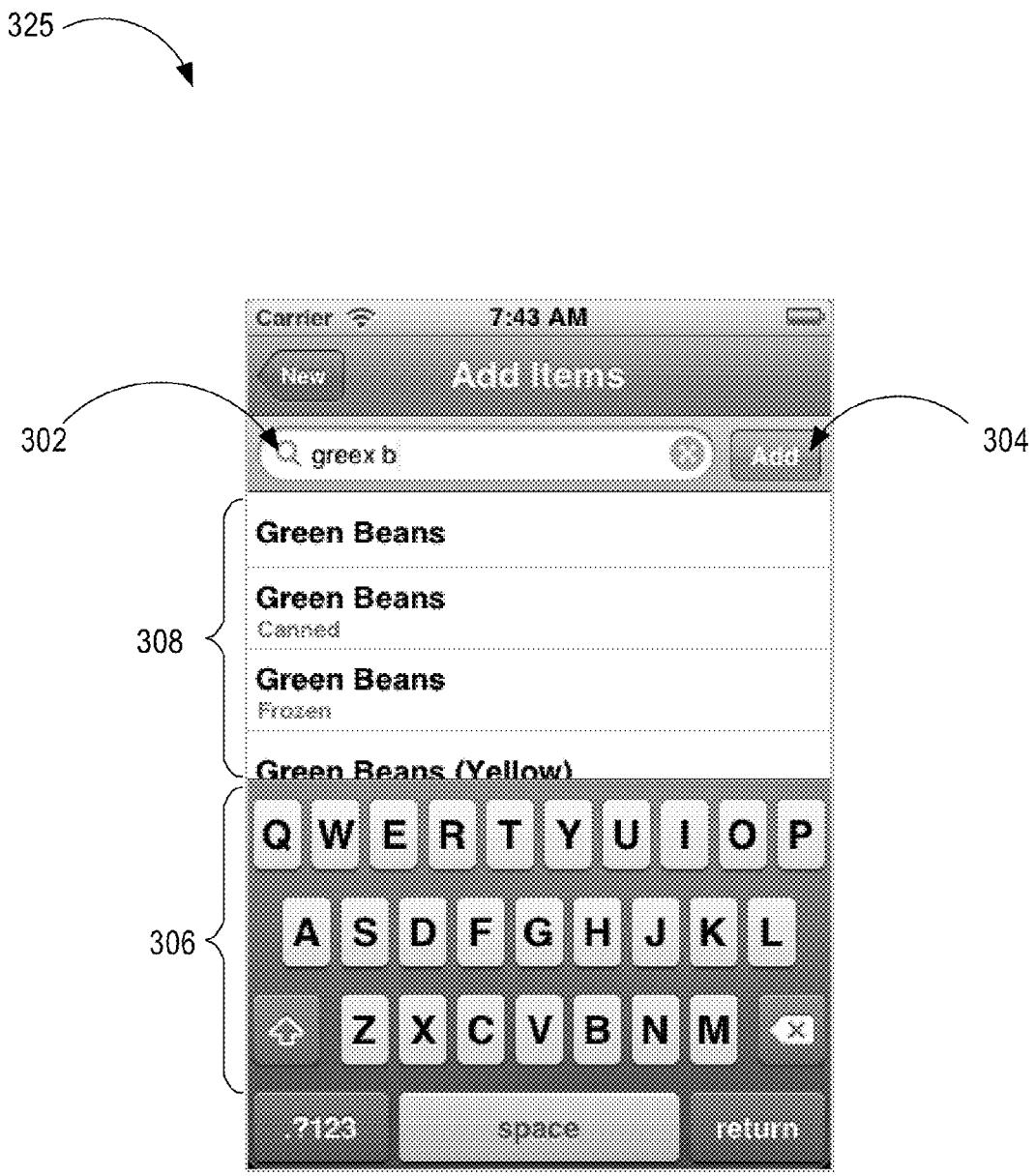

FIG. 3D depicts a screenshot 325 where the current text string in text field 302 is "greex b" and the search results area 308 includes four results that are different than the results depicted in FIG. 3C. In this iteration of process 200, "greex" is in the PastBadWords list and "gree" is in the PastGoodWords list. At block 205, "greex" and "b" are identified as search terms in the current set. By the end of block 230, "greex" is replaced with "gree". Because the current set is not empty (block 235), "greex" is placed in the PastBadWords list (block 245). At block 250, it is determined that the current set (i.e., "gree" and "b") does not match the last clean search ("gree"). Therefore, process 200 proceeds to block 255, where a search is performed based on the terms in the current set (i.e., "gree" and "b"). Search results are found based on this search (block 260), which means that, at block 265, those search results are displayed, the search terms in the current set (i.e., "gree" and "b") are saved to the PastGoodWords list and saved as the last clean search.

Figure 3E:
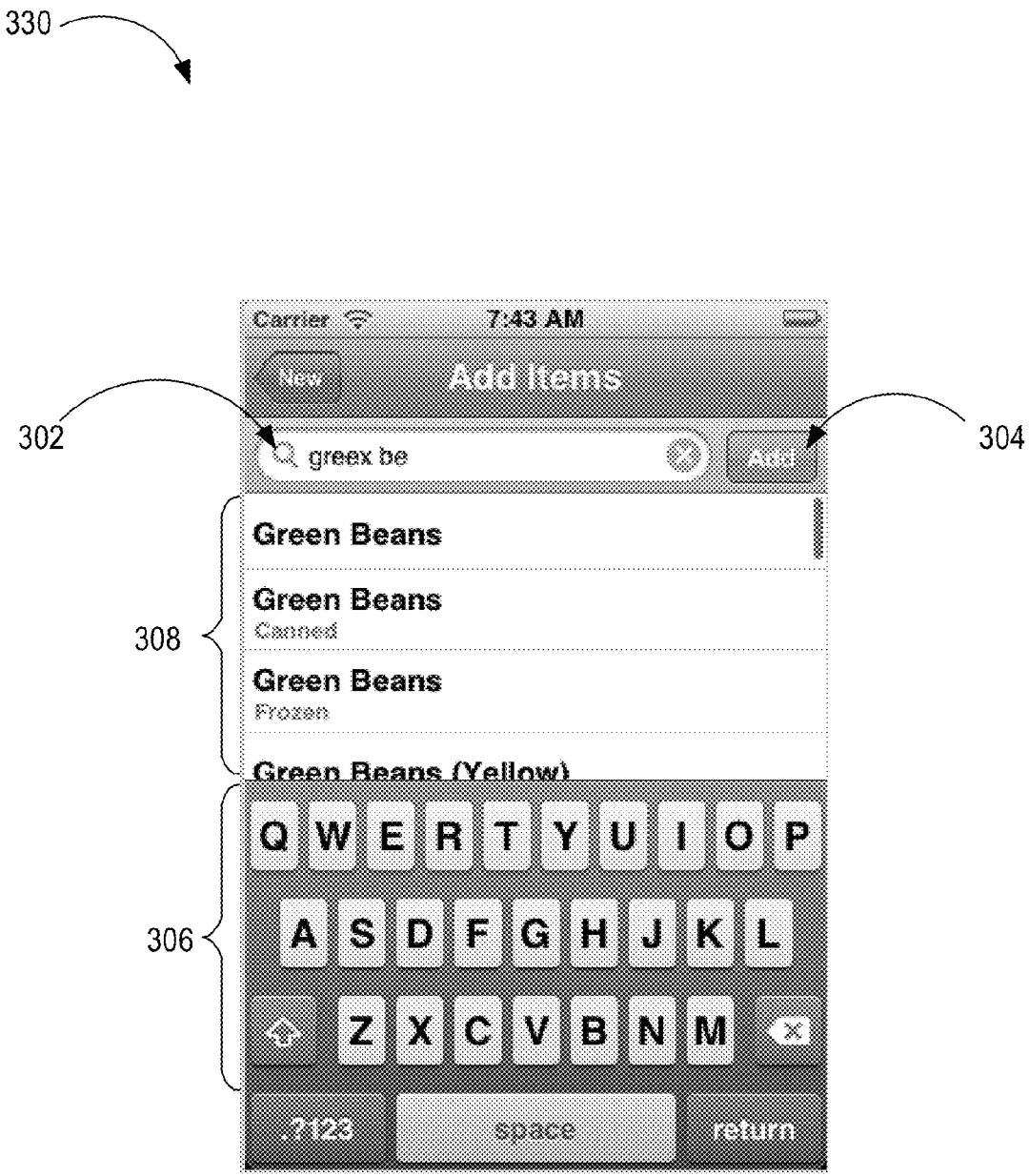

FIG. 3E depicts a screenshot 330 where the current text string in text field 302 is "greex be" and the search results area 308 includes four results that are the same as the results depicted in FIG. 3D. In this iteration of process 200, the search (at block 265) based on "gree" and "be" yields the same search results that were found during a search based on "gree" and "b".

Figure 3F:
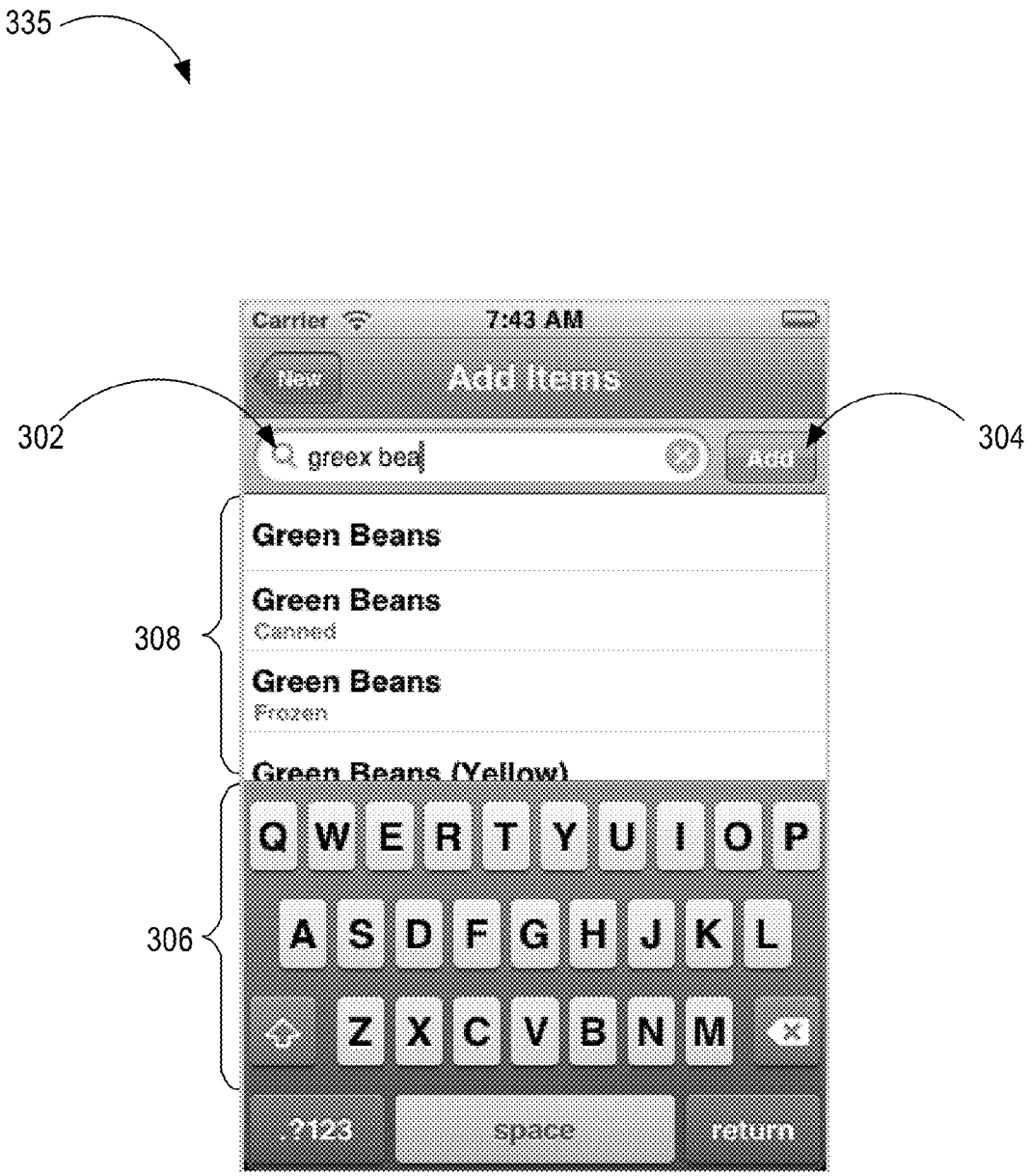

FIG. 3F depicts a screenshot 335 where the current text string in text field 302 is "greex bea" and the search results area 308 includes four results that are the same as the results depicted in FIG. 3E. Similar to the previous iteration, in this iteration of process 200, the search (at block 265) based on "gree" and "bea" yields the same search results that were found during a search based on "gree" and "be".

Figure 3G:
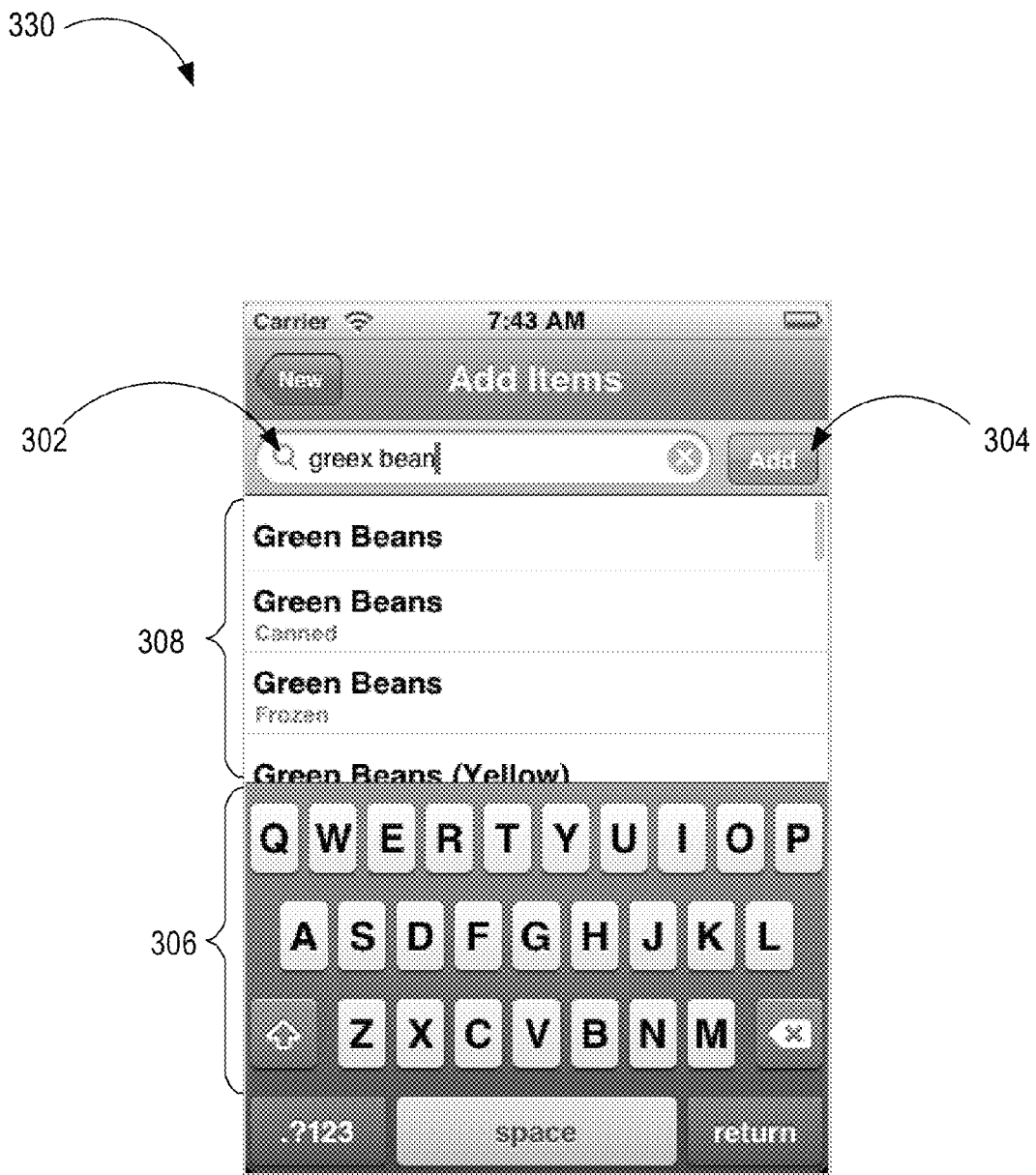

FIG. 3G depicts a screenshot 340 where the current text string in text field 302 is "greex bean" and the search results area 308 includes four results that are the same as the results depicted in FIG. 3F. Similar to the previous iteration, in this iteration of process 200, the search (at block 265) based on "gree" and "bean" yields the same search results that were found during a search based on "gree" and "bea".

Figure 3H:
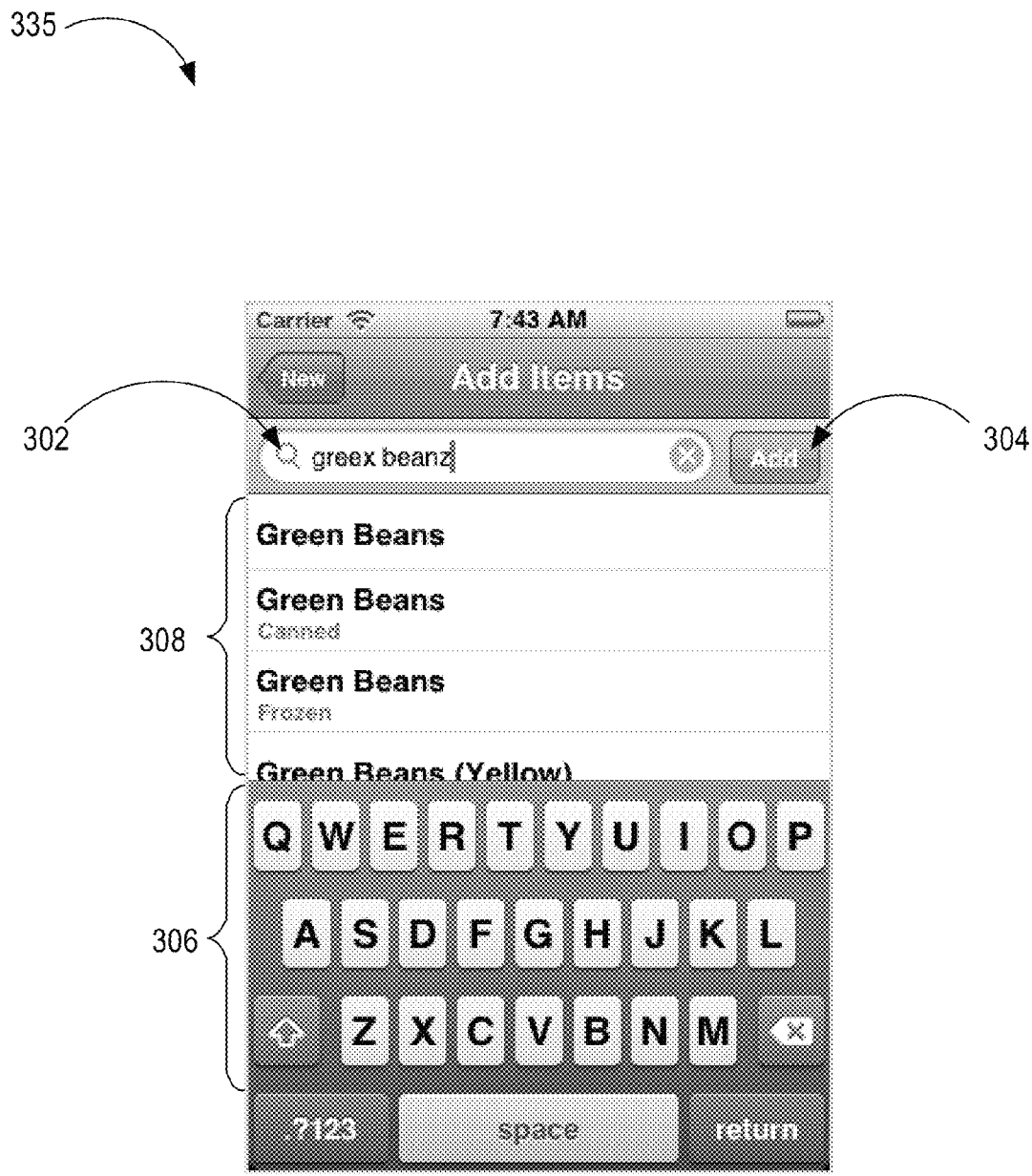

FIG. 3H depicts a screenshot 345 where the current text string in text field 302 is "greex beanz" and the search results area 308 includes four results that are the same as the results depicted in FIG. 3G. In this iteration of process 200, process 200 would arrive at block 260 and no search results would be found because "beanz" is not found in the database. At block 260, the current set includes "gree" and "beanz" because "greex" was replaced with "gree" at block 230. At block 270, the counter would be incremented once (for search term "beanz"). At block 280, "beanz" would be added to the PastBadWords list. Block 295 (retaining currently-displayed search results) would be performed because all the conditions of block 290 are satisfied.

Figure 3I:

FIG. 3I depicts a screenshot 350 where the current text string in text field 302 is "greex beanz c" and the search results area 308 includes three results that are different than the results depicted in FIG. 3H. At the beginning of this iteration of process 200, the PastGoodWords list includes "gree" and "bean" since those search terms were previously used to identify search results. At block 230, both "greex" and "beanz" would be replaced by "gree" and "bean", respectively. Block 255 would be performed using the search terms "gree", "bean" and "c". Block 260 would be performed, where search results are identified. As a result, block 265 would be performed where those search results are displayed to the user and where "gree", "bean", and "c" are saved as the last clean search and are saved in the PastGoodWords list.

Figure 3J:
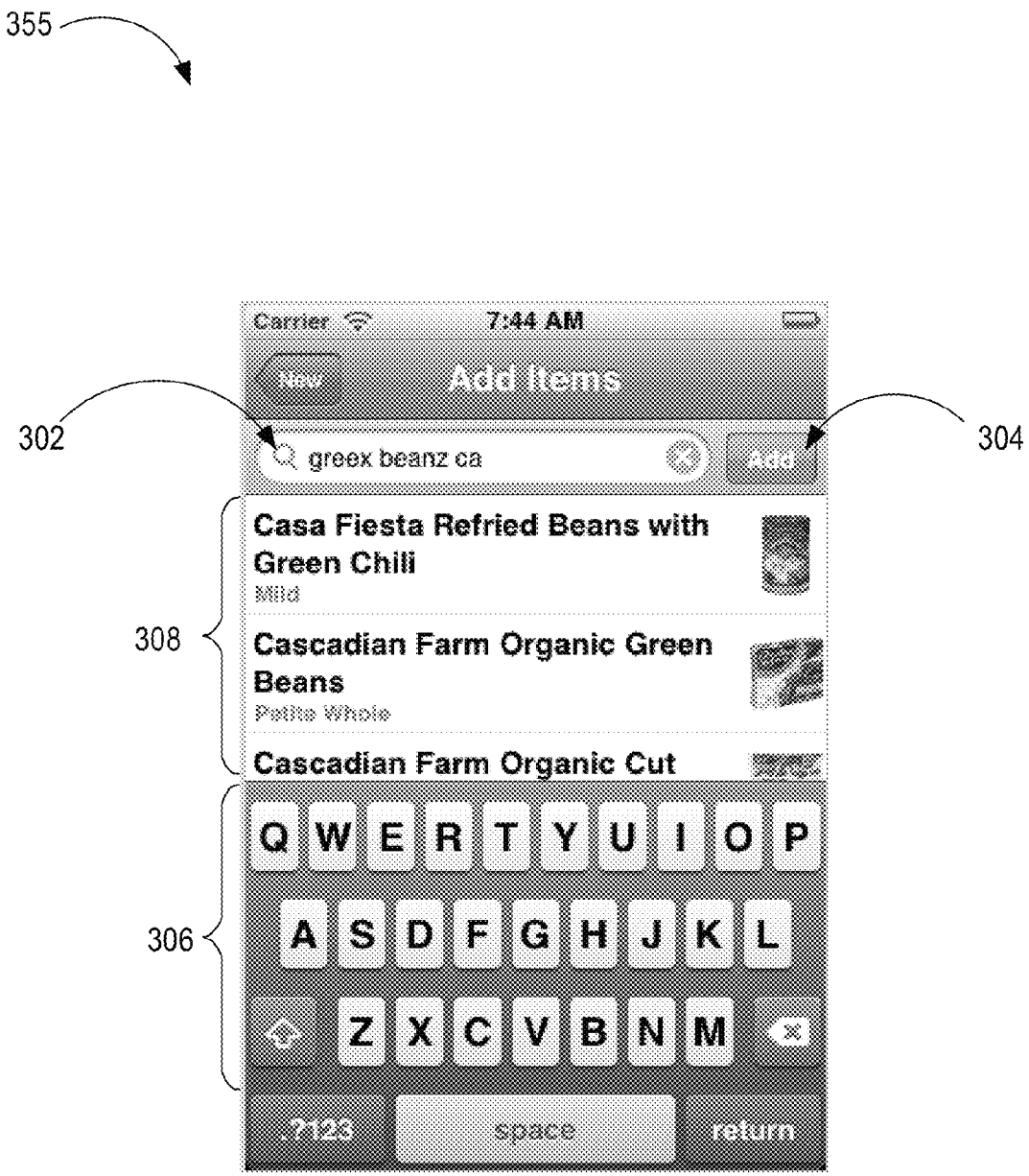

FIG. 3J depicts a screenshot 355 where the current text string in text field 302 is "greex beanz ca" and the search results area 308 includes three results that are different than the results depicted in FIG. 3I. This iteration of process 200 is similar to the iteration described above with respect to FIG. 3I. Search results would be identified and displayed and search terms "gree", "bean", and "ca" would be saved to the PastGoodWords list.

Figure 3K:
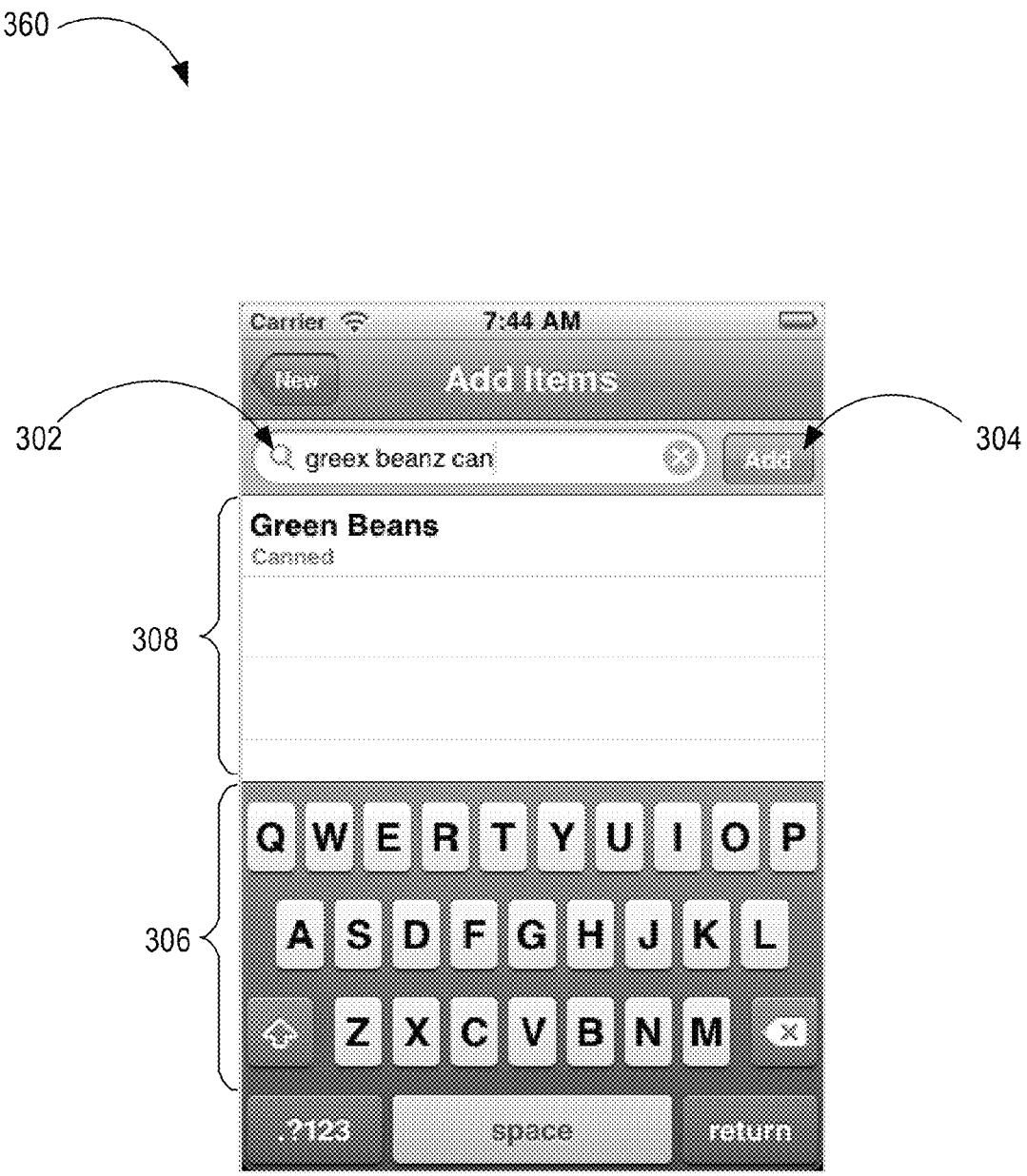

FIG. 3K depicts a screenshot 360 where the current text string in text field 302 is "greex beanz can" and the search results area 308 includes one result. This iteration of process 200 is similar to the iteration described above with respect to FIGS. 3I and 3J. Search results would be identified and displayed and search terms "gree", "bean", and "can" would be saved to the PastGoodWords list.

4.0. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, may be provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, cursor direction keys, or a touch-sensitive screen for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406 or ROM 408. Such instructions may be read into main memory 406 from another storage medium, such as storage device 410. Execution of the sequences of instructions contained in main memory 406 or ROM 408 causes processor 404 to perform the process blocks described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) interface, cable modem, satellite modem, or a modem to provide a data communication connection to a corresponding type of telephone line. As another example, communication interface 418 may be a local area network (LAN) interface to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 may transmit a requested code for an application program through Internet 428, ISP 426, local network 422 and communication interface 418. The received code may be executed by processor 404 as it is received, and/or stored in storage device 410, or other non-volatile storage for later execution.

5.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   performing a first search based on a first text string that comprises one or more terms;
   based on the first search, identifying one or more search results;
   after identifying the one or more search results, causing the one or more search results to be displayed;
   while the one or more search results are displayed:
      receiving first input that changes the first text string to a second text string; in response to receiving the first input:
      performing a second search based, at least in part, on the second text string, and determining that no search results are identified based on the second search;
   after determining that no search results are identified based on the second search, continuing to display the one or more search results;
   while one or more search results are displayed:
      receiving second input that changes a third text string to a fourth text string, wherein the third text string is the second text string or is based on the second text string;
      in response to receiving the second input, performing a third search based on the fourth text string;
      determining whether any search results are identified based on the third search;
   in response to determining that no search results are identified based on the third search, incrementing a miss counter and determining whether the miss counter is above a threshold;
   if the miss counter is above the threshold, then ceasing to display the one or more search results;
   wherein the method is performed by one or more computing devices.

2. A method comprising:
   performing a first search based on a first text string that comprises one or more terms;
   based on the first search, identifying one or more search results;
   after identifying the one or more search results, causing the one or more search results to be displayed;
   while the one or more search results are displayed:
      receiving first input that changes the first text string to a second text string; in response to receiving the first input:
      performing a second search based, at least in part, on the second text string, and determining that no search results are identified based on the second search;
   after determining that no search results are identified based on the second search, continuing to display the one or more search results;
   in response to determining that no search results are identified based on the second search, incrementing a counter for each search term, in a portion of the second text string, that starts with a term in a particular list but does not exactly match the term in the particular list;
   determining whether the counter is equal to a particular threshold;
   wherein continuing to display the one or more search results is performed only if the counter is less than the particular threshold.

3. The method of claim 1, further comprising, prior to performing the second search:
   analyzing the second text string to identify a plurality of search terms within the second text string; and
   for each search term of the plurality of search terms, determining, based on one or more criteria, whether to remove one or more characters from said each search term.

4. A method comprising:
   while a first text string is being formed,
      creating a first list;
      classifying each of one or more terms, of the first text string, as a bad term, wherein a term is classified as a bad term if a search that was performed using the term yielded no search results; adding the one or more terms to the first list;
      creating a second list;
      classifying each of one or more second terms, of the first text string, as a good term, wherein a particular term is classified as a good term if a search that
   was performed using the particular term yielded one or more search results:
      adding the one or more second terms to the second list:
   performing a first search based on the first text string;
   based on the first search, identifying one or more search results:
   after identifying the one or more search results, causing the one or more search results to be displayed;
   while the one or more search results are displayed, receiving first input that changes the first text string to a second text string;
   determining whether a certain term in the second text string begins with a term in the first list;
   in response to determining that the certain term in the second text string begins with a term in the first list, removing the certain term from the second text string;
   determining whether the certain term begins with a term in the second list;
   in response to determining that the certain term begins with a term in the second list, adding the term in the second list to the second text string.

5. The method of claim 4, wherein:
   removing the certain term from the second text string comprises adding the certain term to a third list that is different than the first list and the second list; and
   the method further comprising, prior to performing a second search:
      determining whether the second text string is empty;
      in response to determining that the second text string is not empty, replacing the first list with the third list.

6. The method of claim 4, further comprising, in response to determining that no search results are identified based on a second search:
for each term in the second text string:
determining whether said each term starts with a term in the second list but does not match that term in the second list, and
in response to determining that said each term starts with a term in the second list but does not match that term in the second list, incrementing a counter; and
continuing to display the one or more search results only in response to determining that the counter is less than a threshold number.

7. The method of claim 6, further comprising adding, to the first list, a term from the second text string that starts with a term in the second list but does not match that term in the second list.

8. The method of claim 6, further comprising:
determining whether each term in the second list begins with a term in the second text string; and
continuing to display the one or more search results only in response to determining that each term in the second list begins with a term in the second text string.

9. The method of claim 1, further comprising, prior to performing the second search, determining whether the second text string matches the first text string, wherein the second search is performed only in response to determining that the second text string does not match the first text string.

10. One or more non-transitory storage media storing instructions which, when executed by one or more processors, cause the one or more processors to perform:
performing a first search based on a first text string that comprises one or more terms;
based on the first search, identifying one or more search results;
after identifying the one or more search results, causing the one or more search results to be displayed;
while the one or more search results are displayed:
receiving first input that changes the first text string to a second text string; in response to receiving the first input:
performing a second search based, at least in part, on the second text string, and determining that no search results are identified based on the second search;
after determining that no search results are identified based on the second search, continuing to display the one or more search results;
while one or more search results are displayed:
receiving second input that changes a third text string to a fourth text string, wherein the third text string is the second text string or is based on the second text string;
in response to receiving the second input, performing a third search based on the fourth text string;
determining whether any search results are identified based on the third search;
in response to determining that no search results are identified based on the third search, incrementing a miss counter and determining whether the miss counter is above a threshold;
if the miss counter is above the threshold, then ceasing to display the one or more search results.

11. One or more non-transitory storage media storing instructions which, when executed by one or more processors, cause:
performing a first search based on a first text string that comprises one or more terms;
based on the first search, identifying one or more search results;
after identifying the one or more search results, causing the one or more search results to be displayed;
while the one or more search results are displayed:
receiving first input that changes the first text string to a second text string;
in response to receiving the first input:
performing a second search based, at least in part, on the second text string, and determining that no search results are identified based on the second search;
after determining that no search results are identified based on the second search, continuing to display the one or more search results;
in response to determining that no search results are identified based on the second search, incrementing a counter for each search term, in the portion of the second text string, that starts with a term in a particular list but does not exactly match the term in the particular list;
determining whether the counter is equal to a particular threshold;
wherein continuing to display the one or more search results is performed only if the counter is less than the particular threshold.

12. The one or more non-transitory storage media of claim 10, wherein the instructions, when executed by the one or more processors, further cause, prior to performing the second search:
analyzing the second text string to identify a plurality of search terms within the second text string; and
for each search term of the plurality of search terms, determining, based on one or more criteria, whether to remove one or more characters from said each search term.

13. One or more non-transitory storage media storing instructions which, when executed by one or more processors, cause:
while a first text string is being formed,
creating a first list;
classifying each of one or more terms, of the first text string, as a bad term, wherein a term is classified as a bad term if a search that was performed using the term yielded no search results;
adding the one or more terms to the first list;
creating a second list;
classifying each of one or more second terms, of the first text string, as a good term, wherein a particular term is classified as a good term if a search that was performed using the particular term yielded one or more search results;
adding the one or more second terms to the second list;
performing a first search based on the first text string;
based on the first search, identifying one or more search results;
after identifying the one or more search results, causing the one or more search results to be displayed;
while the one or more search results are displayed, receiving first input that changes the first text string to a second text string;
determining whether a certain term in the second text string begins with a term in the first list;
in response to determining that the certain term in the second text string begins with a term in the first list, removing the certain term from the second text string;
determining whether the certain term begins with a term in the second list;

in response to determining that the certain term begins with a term in the second list, adding the term in the second list to the second text string.

14. The one or more non-transitory storage media of claim 13, wherein:
removing the certain term from the second text string comprises adding the certain term to a third list that is different than the first list and the second list; and
the instructions, when executed by the one or more processors, further cause, prior to performing a second search:
determining whether the second text string is empty;
in response to determining that the second text string is not empty, replacing the first list with the third list.

15. The one or more non-transitory storage media of claim 13, wherein the instructions, when executed by the one or more processors, further cause, in response to determining that no search results are identified based on a second search:
for each term in the second text string:
determining whether said each term starts with a term in the second list but does not match that term in the second list, and
in response to determining that said each term starts with a term in the second list but does not match that term in the second list, incrementing a counter; and
continuing to display the one or more search results only in response to determining that the counter is less than a threshold number.

16. The one or more non-transitory storage media of claim 15, wherein the instructions, when executed by the one or more processors, further cause adding, to the first list, a term from the second text string that starts with a term in the second list but does not match that term in the second list.

17. The one or more non-transitory storage media of claim 15, wherein the instructions, when executed by the one or more processors, further cause:
determining whether each term in the second list begins with a term in the second text string; and
continuing to display the one or more search results only in response to determining that each term in the second list begins with a term in the second text string.

18. The one or more non-transitory storage media of claim 10, wherein the instructions, when executed by the one or more processors, further cause, prior to performing the second search, determining whether the second text string matches the first text string, wherein the second search is performed only in response to determining that the second text string does not match the first text string.

19. The method of claim 1, wherein the one or more search results are displayed on a screen of a mobile phone.

20. The method of claim 2, wherein:
performing a third search based on a third text string;
based on the third search, identifying one or more third search results;
receiving third input that changes the third text string to a fourth text string;
in response to receiving the third input, without receiving further input, and without performing another search:
removing one or more characters from the fourth text string to create a modified text string;
wherein removing the one or more characters comprises replacing a particular term in the fourth text string with a previous term from a particular list of terms to create the modified text string;
wherein the particular list of terms includes one or more terms that were added to the particular list of terms in response to a determination that one or more searches based on the one or more terms resulted in identifying at least one search result.

21. The one or more non-transitory storage media of claim 11, wherein:
performing a third search based on a third text string;
based on the third search, identifying one or more third search results;
receiving third input that changes the third text string to a fourth text string;
in response to receiving the third input, without receiving further input, and without performing another search:
removing one or more characters from the fourth text string to create a modified text string;
wherein removing the one or more characters comprises replacing a particular term in the fourth text string with a previous term from a particular list of terms to create the modified text string;
wherein the particular list of terms includes one or more terms that were added to the particular list of terms in response to a determination that one or more searches based on the one or more terms resulted in identifying at least one search result.

22. The one or more non-transitory storage media of claim 10, wherein the one or more search results are displayed on a screen of a mobile phone.

\* \* \* \* \*